(12) United States Patent
Hirooka et al.

(10) Patent No.: US 7,352,504 B2
(45) Date of Patent: Apr. 1, 2008

(54) OPTICAL FOURIER TRANSFORM DEVICE AND METHOD

(75) Inventors: Toshihiko Hirooka, Sendai (JP); Masataka Nakazawa, Sendai (JP)

(73) Assignee: Japan Science and Technology Agency (JP)

( * ) Notice: Subject to any disclaimer, the term of this patent is extended or adjusted under 35 U.S.C. 154(b) by 0 days.

(21) Appl. No.: 10/584,932

(22) PCT Filed: Dec. 27, 2004

(86) PCT No.: PCT/JP2004/019517

§ 371 (c)(1),
(2), (4) Date: Mar. 20, 2007

(87) PCT Pub. No.: WO2005/066707

PCT Pub. Date: Jul. 21, 2005

(65) Prior Publication Data

US 2007/0273958 A1    Nov. 29, 2007

(30) Foreign Application Priority Data

Jan. 5, 2004    (JP) ............................. 2004-000464

(51) Int. Cl.
G02F 1/35    (2006.01)
G02F 2/02    (2006.01)

(52) U.S. Cl. ...................................... 359/327; 359/326
(58) Field of Classification Search ......... 359/326–332
See application file for complete search history.

(56) References Cited

U.S. PATENT DOCUMENTS 6,650,466 B1 * 11/2003 Wise et al. ................ 359/328
6,744,552 B2 * 6/2004 Scalora et al. ............. 359/326

(Continued)

FOREIGN PATENT DOCUMENTS

JP    05-265057 A    10/1993

OTHER PUBLICATIONS

Mouradian L. Kh et al Spectro-Temporal imaging of Femtose cond Events, IEEE Journal of Quantum Electronics, vol. 36 No. 7 p. 795-801.

(Continued)

Primary Examiner—Tina M. Wong
Assistant Examiner—Daniel J Petkovsek
(74) Attorney, Agent, or Firm—Lowe Hauptman Ham & Berner, LLP

(57) ABSTRACT

Optical Fourier transform is executed over a wide time range. A quadratic function type optical pulse generator (7) generates a control light pulse of a shape expressed by a quadratic function or a parabola according to a clock signal based on a signal light pulse from an optical coupler (1). The signal light pulse inputted is multiplexed by a multiplexer (9) with the control light pulse optically delayed by an optical delay element (8) so that the timing is matched with the signal light pulse, and introduced into an optical Kerr medium (10). In the optical Kerr medium (10), the signal light pulse inputted by the mutual phase modulation between the signal light pulse and the control light pulse is subjected to a linear phase modulation (frequency chirp) over the entire pulse or a wide time range. After that, the signal light pulse isolated by an optical filter (11) is introduced into the dispersion medium (12) having a group velocity dispersion (secondary dispersion), thereby converting the time waveform of the inputted signal light pulse into the shape of the frequency spectrum.

18 Claims, 13 Drawing Sheets

OTHER PUBLICATIONS

Kolner, B.H. Space-Time Duality and the Theory of Temporal Imaging, IEEE Journal of Quantum Electronics, vol. 30, No. 8 (1994) p. 1951-1963.

Fermann M. E. et al Self-Similar Propagation and Amplification of Parabolic Pulses in Optical Fibers, Physical Review Letters, vol. 84 No. 26 (2000) p. 6010-6013.

Anderson, D. et al., Wave-breaking-free pulses in nonlinear-optical fibers, J. Opt Soc. Am. B, vol. 10., No. 7 (1993) p. 1185-1190.

Hirooka T. Nakazawa M. Parabolic pulse generation by use of a dispersion decreasing fiber with normal group-velocity dispersion, Optics Letters, vol. 29, No. 5 (Mar. 2004) p. 498-500.

"Time-lens timing-jitter compensator in ultra long, haul DWDM dispersion managed solution transmissions" Lion F. Mollenauer and Chris Xu Oprical Society of America 2002.

"Time domain Fourier optics for polarization mode dispersion compensation" M. Romagnoli et al Oprical Society of America 1999.

"Timing jitter eater for oprical pulse trains" Leaf A. Jiang et al Research Institute of Electrical Communication, Tohoku University, Sendal 980-8577 Japan.

\* cited by examiner (a)

(b)

OPTICAL FOURIER TRANSFORM DEVICE AND METHOD

FIELD OF THE INVENTION

The present invention relates to an optical Fourier transform device and method, and particularly to an optical Fourier transform device and method which converts the temporal waveform of an optical pulse into the shape (envelope curve) of a frequency spectrum thereof and/or converts the shape of the frequency spectrum of the optical pulse into the temporal waveform thereof.

BACKGROUND OF THE INVENTION

Various applications using an optical Fourier transform technique to convert the temporal waveform of an optical pulse into the shape of a frequency spectrum thereof or to convert the shape of the frequency spectrum of the optical pulse into the temporal waveform thereof have been proposed in the fields of ultrahigh-speed optical communication, ultra-short pulse mode-locked laser, optical signal processing and the like. For example, in the ultrahigh-speed optical communication, there have been proposed applications to the reduction of random fluctuation (timing jitter) of a time position of each pulse in a signal optical pulse train (see, for example, non-patent document 1), the compensation of polarization mode dispersion (see, for example, non-patent document 2), and the like. Besides, the optical Fourier transform technique is effective also in the suppression of timing jitter of an ultra-short pulse emitted from a mode-locked laser (for example, non-patent document 3). Besides, there is a document disclosing the generation of a quadratic function type optical pulse using an optical fiber amplifier having a normal dispersion (see, for example, non-patent document 4).

The present inventor has filed applications on waveform distortion-free transmission in which a time and a frequency are replaced with each other at the receiver side and transmission data is completely reproduced, since in general, even if any linear distortion effects exist in an optical fiber, the spectrum shape of a pulse is invariable (Japanese Patent Application No. 2003-23973 "Optical Transmission Method and Optical Transmission Device", Japanese Patent Application No. 2003-181964 "OTDM Transmission Method and Device"), optical pulse compression and optical function generation (Japanese Patent Application No. 2003-109708 "Optical pulse Compressor and Light Function Generator, Optical pulse Compression Method and Light Function Generation Method"). Besides, the inventor has filed an application on a method and device which generates an optical pulse expressed by a quadratic function type without using an optical fiber amplifier (Japanese Patent Application No. 2003-387563 "Optical pulse Generation Method and Optical pulse Compression Method, etc."). The contents of these applications can be incorporated in the present specification by reference.

FIG. 1 shows a structural example of a circuit conventionally used to perform optical Fourier transform. In the figure, this circuit includes a phase modulator (LN phase modulator) 2 using the Pockels effect in an electro-optic crystal such as LiNbO$_3$ crystal, and a dispersive medium 3 having a dispersion amount D. Incidentally, when the dispersion parameter of the dispersive medium 3 is $\beta_2$[ps$^2$/km] and the length is L[km], the dispersion amount is given by D=$\beta_2$L[ps$^2$]. Besides, in the figure, a solid line indicates an optical pulse, and a dotted line indicates an electric signal.

An optical fiber, a diffraction grating pair, a fiber Bragg grating or the like is used as the dispersive medium 3. The peak of a modulation characteristic of the phase modulator 2 is made to coincide with the center position of an optical pulse. The magnitude of a chirp (chirp rate K) applied to a pulse by the LN phase modulator 2 can be obtained in a manner as described below. When voltage V(t)=V$_0$ cos($\omega_m$t) is applied to the phase modulator 2, a light phase change amount $\Delta\phi$(t) caused by a change in refractive index due to the electro-optic effect is given by

[Mathematical formula 1]

$$\Delta\phi(t) = M\cos(\omega_m t),\ M = \frac{\pi V_0}{V_\pi} \quad (1)$$

Where $V_\pi$ denotes a half-wavelength voltage (applied voltage necessary to rotate the phase of light by $\pi$), $\omega_m$ denotes the drive frequency of the phase modulator, and $V_0$ denotes the amplitude of the voltage. When expression (1) is expanded into Taylor series in the vicinity (t=0) of the center of the pulse, it can be approximated by

[Mathematical formula 2]

$$\Delta\phi(t) = M\left(1 - \frac{\omega_m^2}{2}t^2\right) = \Delta\phi(0) + \frac{K}{2}t^2,\ K = -M\omega_m^2 \quad (2)$$

That is, by the LN phase modulator, a frequency chirp

[Mathematical formula 3]

$$\Delta\omega(t) = -\frac{\partial \Delta\phi}{\partial t} = -Kt$$

which has the chirp rate K and is approximately linear is applied to the optical pulse.

In FIG. 1, the optical pulse having a temporal waveform u(t) and a frequency spectrum U($\omega$) is first divided into two parts by an optical coupler 1, and the one part is launched to the LN phase modulator 2. The other part is launched to a clock extraction circuit 4, and a clock signal (sinusoidal signal) is extracted from the pulse train. The emitted signal is applied to the LN phase modulator 2 through a phase shifter 5 and an electrical amplifier 6, so that the LN phase modulator 2 is driven. The phase shifter 5 is inserted in order to apply phase modulation to the optical pulse optimally synchronously. The electric amplifier 6 is for driving the LN phase modulator 2.

The optical pulse launched to the LN phase modulator 2 is given the linear chirp $\Delta\omega$(t)=-Kt, and as a result, at each time position of the pulse waveform, it acquires a frequency shift with a magnitude proportional to the time. Further, the linearly chirped pulse is launched to the dispersive medium 3. In the dispersive medium 3, a time delay (group delay in the pulse) depending on frequency by a group-velocity dispersion is given to the temporal waveform of the optical pulse. Since the optical pulse is previously given the linear chirp in the LN phase modulator 2, the respective frequency components of the optical pulse are separated in the dispersive medium 3 to different positions in the time domain. As a result, when the dispersion amount D with respect to the chirp rate K is selected to be D=1/K, the waveform in proportion to a spectrum shape U(ω) (where ω=t/D) of the optical pulse before optical Fourier transform is obtained in the time domain at the output of the dispersive medium 3.

Non-patent document 1: L. F. Mollenauer and C. Xu, "Time-lens timing-jitter compensator in ultra-long haul DWDM dispersion managed soliton transmissions," in Conference on Lasers and Electro-Optics (CLEO) 2002, paper CPDB1 (2002).

Non-patent document 2: M. Romagnoli, P. Franco, R. Corsini, A. Schiffini, and M. Midrio, "Time-domain Fourier Optics for polarization-mode dispersion compensation," Optics Letters, vol. 24, no. 17, pp. 1197-1199 (1999).

Non-patent document 3: L. A. Jiang, M. E. Grein, H. A. Haus, E. P. Ippen, and H. Yokoyama, "Timing jitter eater for optical pulse trains," Optics Letters, vol. 28, no. 2, pp. 78-80 (2003).

Non-patent document 4: M. E. Fermann, V. I. Kruglov, B. C. Thomsen, J. M. Dudley, and J. D. Harvey, "Self-similar propagation and amplification of parabolic pulses in optical fibers," Phys. Rev. Lett. Vol. 84, pp. 6010-6013 (2000).

DISCLOSURE OF THE INVENTION

Problems to be Solved

However, there is a case where an LN phase modulator used in conventional optical Fourier transform can not give a linear chirp uniformly over the entire pulse. FIG. 2 is a schematic view showing the magnitude of a phase modulation (a) applied to an optical pulse by the LN phase modulator and a phase shift (b). Dotted lines indicate a phase modulation characteristic expressed by a quadratic function and the magnitude of the frequency shift which is linear with respect to the time. As shown in FIG. 2, a range in which the sinusoidal modulation characteristic of the LN phase modulator can be approximated by a quadratic curve (range in which the chirp applied to the optical pulse by the LN phase modulator can be regarded as linear) is limited to the vicinity of the center of the pulse. Here, this will be called an allowable window width of optical Fourier transform. When this allowable window width is narrow as compared with the time width of the optical pulse, there has been a serious problem that the optical Fourier transform can not be accurately executed to the optical pulse component in a range outside the window width.

Besides, as described in the former section, the dispersion amount D of the dispersive medium constituting the optical Fourier transform device and the magnitude K of the chirp rate of the phase modulator are related by D=1/K. Since the magnitude of the dispersion amount D which can be given by the dispersive medium is limited by the characteristic of a device, in order to reduce the required dispersion amount D, it is necessary to increase the chirp rate K of the phase modulator. On the other hand, the upper limit of the magnitude of the chirp rate K is determined by the length of the LN phase modulator, the thickness thereof in the direction of voltage application, the characteristic of an electrode, and the like. Thus, in the conventional optical Fourier transform device, there is a serious limitation to the available characteristic of the optical Fourier transform by the limitation in the characteristic of the dispersive medium and the characteristic of the LN phase modulator.

Further, in the LN phase modulator, since the processing speed by the electric circuit is limited to about 40 GHz, it has been difficult to perform the optical Fourier transform by the conventional method to the ultrahigh-speed optical pulse train whose transmission speed exceeds 40 Gbit/s.

The above problems are serious obstructions to the realization of various applications of the optical Fourier transform technique described in the former section. Therefore, in order to solve these problems, the invention has an object to provide an optical Fourier transform device and method in which a phase modulation characteristic is improved so that it is expressed by a quadratic function, and optical Fourier transform can be executed over a wide time range. Besides, one of objects of the invention is to provide an optical Fourier transform device and method in which the adjustment range of a chirp rate K of a chirp applied to a signal light is wide. Further, the invention has an object to provide an optical Fourier transform device and method in which optical Fourier transform can be performed on an ultrahigh-speed optical pulse train whose transmission speed exceeds the limitation of processing speed of an electric circuit.

Means to Solve the Problems

An optical Fourier transform device and method according to an aspect of the invention is an optical Fourier transform device and method in which a signal optical pulse is coupled with a parabolic control optical pulse of a shape expressed by a quadratic function, the signal optical pulse is subjected to a linear phase modulation (frequency chirp) over the entire pulse by the cross phase modulation between the signal and the control optical pulse in an optical Kerr medium, and thereafter, the signal optical pulse is introduced into a dispersive medium having a group-velocity dispersion (second-order dispersion), thereby the temporal waveform of the signal optical pulse is converted into the shape of a frequency spectrum thereof.

In the invention, in the optical Fourier transform device and method, a chirp rate K of the frequency chirp applied to the signal light by the cross phase modulation between itself and the control light and a dispersion amount D of the dispersive medium satisfy a relation of D=1/K, and the chirp rate K can be adjusted by changing the peak power of the control light, the length of the optical Kerr medium, and the nonlinear refractive index ($n_2$) of the optical Kerr medium, which is one of features.

In the invention, besides, in the optical Fourier transform device and method, as a method of generating the parabolic control optical pulse, one of an optical fiber amplifier having a normal dispersion, a dispersion-decreasing fiber in which the value of a normal dispersion is gradually decreased in a longitudinal direction, and an optical filter in which an amplitude transmission characteristic is expressed by a quadratic function and an optical Fourier transform device, which is one of the features.

In the invention, further, in the optical Fourier transform device and method, in order to efficiently generate the high-speed cross phase modulation between the control light and the signal light, the low dispersion optical Kerr medium having a very low dispersion value is used, or wavelengths of the signal light and the control light are set so that they are symmetrical to each other with respect to a zero-dispersion wavelength of the optical Kerr medium (walk-off free), which is also one of the features.

An optical Fourier transform device and method according to another aspect of the invention is an optical Fourier transform device and method in which contrary to the foregoing sequence, first, a signal light is made to pass through a dispersive medium, and thereafter, the signal optical pulse is coupled with a parabolic control optical pulse of a shape expressed by a quadratic function, and the signal optical pulse is linearly chirped over the entire pulse by the cross phase modulation between itself and the control optical pulse in an optical Kerr medium, thereby the shape of a frequency spectrum of the signal optical pulse is converted into the temporal waveform thereof.

Besides, an optical Fourier transform device and method according to another aspect of the invention is an optical Fourier transform device and method in which first, a signal light is made to pass through a dispersive medium, and thereafter, the signal optical pulse is coupled with a parabolic control optical pulse of a shape expressed by a quadratic function, the signal optical pulse is linearly chirped over the entire pulse by the cross phase modulation between itself and the control optical pulse in an optical Kerr medium, and further, the signal optical pulse is again introduced into the dispersive medium, thereby the temporal waveform of the signal optical pulse is converted into the shape of the frequency spectrum thereof, and the shape of the frequency spectrum of the signal optical pulse is converted into the temporal waveform thereof.

In the invention, in the optical Fourier transform device and method, the signal light passes through the dispersive medium twice so that the chirp is completely compensated, and the transform-limited waveform without chirp can be obtained at the output, which is one of features.

Besides, an optical Fourier transform device and method according to another aspect of the invention is an optical Fourier transform device and method in which a signal optical pulse is coupled with a parabolic control optical pulse of a shape expressed by a quadratic function, the signal optical pulse is linearly chirped in an optical Kerr medium over the entire pulse by the cross phase modulation between itself and the control optical pulse, and thereafter, the signal optical pulse is introduced into a dispersive medium, and further, the signal optical pulse is again coupled with the control optical pulse, and the signal optical pulse is again linearly chirped in the optical Kerr medium over the entire pulse by the cross phase modulation between itself and the control optical pulse, thereby the temporal waveform of the signal optical pulse is converted into the shape of the frequency spectrum thereof, and the shape of the frequency spectrum of the signal optical pulse is converted into the temporal waveform thereof.

In the invention, in the optical Fourier transform device and method, the signal light passes through the optical Kerr medium twice so that the chirp is completely compensated, and the transform-limited waveform without chirp is obtained at the output, which is one of the features.

According to the first solving means of this invention, there is provided an optical Fourier transform device comprising:

a parabolic optical pulse generator to generate a control optical pulse of a shape expressed by a quadratic function or a parabola;

a coupler to couple a signal optical pulse with the control optical pulse;

an optical Kerr medium to linearly chirp the signal optical pulse over an entire pulse or a wide time range by cross phase modulation between the signal optical pulse and the control optical pulse; and a dispersive medium having a group-velocity dispersion, wherein the launched signal optical pulse and the control optical pulse are coupled by the coupler and are introduced into the optical Kerr medium, the launched signal optical pulse is linearly chirped by the optical Kerr medium by the cross phase modulation between the signal optical pulse and the control optical pulse, the signal optical pulse emitted from the optical Kerr medium is made to pass through the dispersive medium, to convert a temporal waveform of the launched signal optical pulse into a shape of a frequency spectrum thereof.

According to a second solving means of this invention, there is provided an optical Fourier transform device comprising:

a parabolic optical pulse generator to generate a control optical pulse of a shape expressed by a quadratic function or a parabola;

a coupler to couple a signal optical pulse with the control optical pulse;

an optical Kerr medium to linearly chirp the signal optical pulse over an entire pulse or a wide time range by cross phase modulation between the signal optical pulse and the control optical pulse; and a dispersive medium having a group-velocity dispersion, wherein the launched signal optical pulse is made to passes through the dispersive medium, the signal optical pulse emitted from the dispersive medium and the control optical pulse are coupled by the coupler and are introduced into the optical Kerr medium, the signal optical pulse emitted from the dispersive medium is linearly chirped by the optical Kerr medium by the cross phase modulation between the signal optical pulse and the control optical pulse, to convert a shape of a frequency spectrum of the launched signal optical pulse into a temporal waveform.

ADVANTAGE

In the optical Fourier transform device and method of the invention, the optical pulse whose shape is parabolic is used as the control light, and the linear chirp can be applied to the signal light by the cross phase modulation between itself and the signal light, and accordingly, more accurate optical Fourier transform can be realized. Besides, since the optical Fourier transform device and method of the invention does not require signal processing using an electric circuit, the optical Fourier transform can be performed also on the high-speed signal pulse train exceeding the limit of the processing speed by the electricity. Accordingly, various applications of the optical Fourier transform, which have been limited by the performance of the conventional optical Fourier transform device, can be realized by the optical Fourier transform device and method of the invention.

EMBODIMENT OF THE INVENTION

Hereinafter, embodiments of the invention will be described in detail by use of the drawings.

A. First Embodiment (Device Structure)

Figure 3:
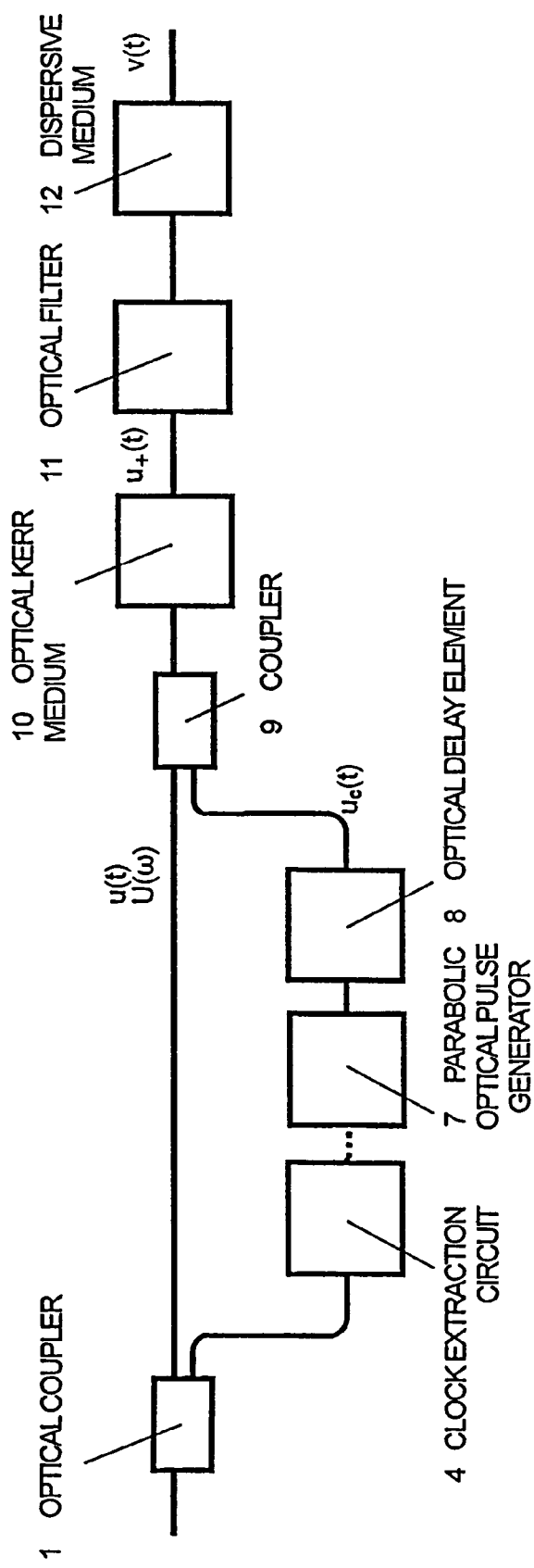
FIG. 3 is a view showing a structure of a first embodiment of an optical Fourier transform device of the invention.

FIG. 3 is a structural view of an optical Fourier transform device of a first embodiment of the invention. The optical Fourier transform device includes an optical coupler 1, a clock extraction circuit 4, a parabolic optical pulse generator 7, an optical delay element 8, a coupler 9, an optical Kerr medium 10, an optical filter 11 and a dispersive medium 12.

The optical Kerr medium 10 is the medium having the third-order nonlinear refractive index, and for example, a single mode optical fiber, a photonic crystal fiber, a semiconductor optical amplifier, an erbium-doped optical fiber amplifier, an organic nonlinear material or the like is used.

As the dispersive medium 12, for example, a single mode optical fiber having a group-velocity dispersion characteristic in which a zero-dispersion region exists in the vicinity of a wavelength band of 1.3 μm, or a diffraction grating pair, a fiber Bragg grating or the like can be used. The clock extraction circuit 4 receives the signal optical pulse separated by the optical coupler 1, and extracts a clock signal based on the signal optical pulse. Incidentally, a solid line in the figure indicates an optical pulse (light signal), and a dotted line indicates an electric signal. The same applies to the following views showing the structure of a Fourier transform device and a parabolic optical pulse generator.

The parabolic optical pulse generator 7 generates the control optical pulse in accordance with the clock signal emitted from the clock extraction circuit. The optical delay element 8 gives an appropriate time delay so that the center time position of the control optical pulse is matched with the timing of the signal optical pulse. The optical filter 11 is the filter to separate the signal light from the control light.

(Parabolic Optical Pulse Generator)

The parabolic optical pulse generator 7 is a device to generate a pulse having a parabolic waveform (hereinafter also referred to as a control optical pulse or a parabolic optical pulse), and can be realized in, for example, the following three modes.

Figure 4:
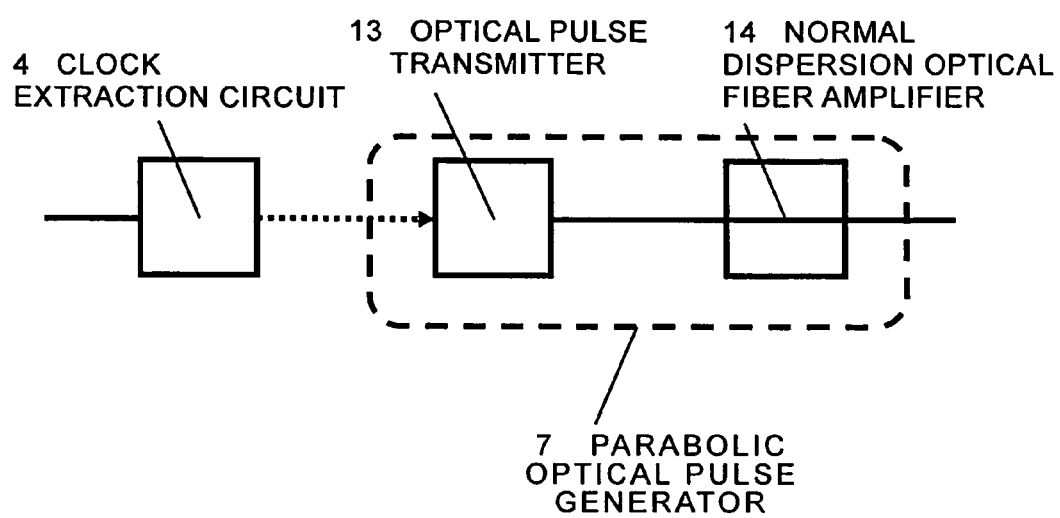
FIG. 4 is a view showing a structure (first mode) of a parabolic optical pulse generator 7 in FIG. 3.

The first mode uses an optical fiber amplifier having a normal dispersion (see, for example, non-patent document 4). FIG. 4 shows a structure of a parabolic optical pulse generator of the first mode. The parabolic optical pulse generator 7 of the first mode includes an optical pulse transmitter 13 and a normal dispersion optical fiber amplifier 14. The optical pulse transmitter 13 is fabricated by combination of, for example, a mode-locked laser driven by a clock extracted from the signal light by using the clock extraction circuit 4, an EA (Electro-Absorption) modulator, or an LN modulator. When the optical pulse emitted from the optical pulse transmitter 13 is launched to the normal dispersion optical fiber amplifier 14, the pulse is linearly chirped over the whole waveform by the normal dispersion and the nonlinear optical effect, and at the same time, the shape of the pulse is shaped into a parabola.

Figure 5:
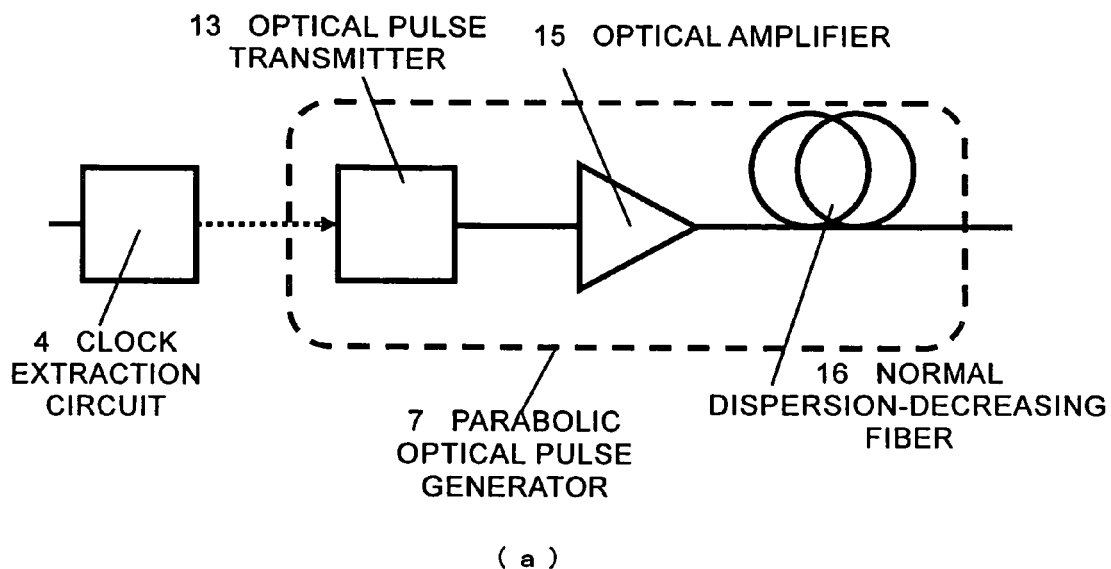
FIG. 5 is a view showing a structure (second mode) of the parabolic optical pulse generator 7 in FIG. 3.
Figure 5:
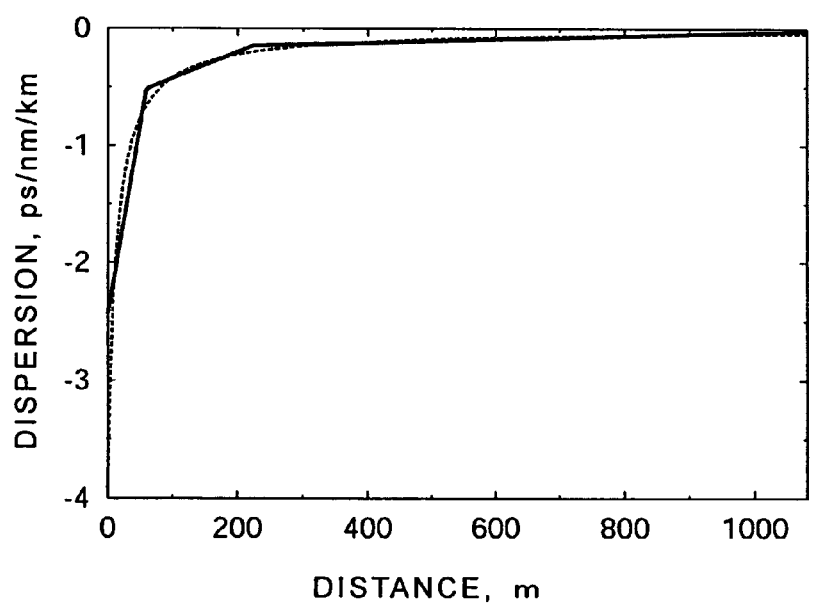

The second mode uses an optical fiber which has a normal dispersion and in which the magnitude of a dispersion value is gradually decreased in the longitudinal direction (see, for example, Japanese Patent Application No. 2003-387563 "Optical pulse Generation Method and Optical pulse Compression Method, etc."). FIG. 5 shows a structure of the parabolic optical pulse generator 7 of the second mode. When an optical pulse emitted from an optical pulse transmitter 13, which is driven by a clock signal similarly to the first mode, is amplified by an optical amplifier 15 and is launched to a normal dispersion-decreasing fiber 16, a parabolic pulse is obtained at the output thereof.

The parabolic optical pulse generator 7 includes the optical pulse transmitter 13, the optical amplifier 15, and the normal dispersion-decreasing fiber 16. As the optical pulse transmitter 13, for example, a mode locked fiber laser or a mode locked semiconductor laser can be used. When consideration is given to the use in an optical communication wavelength band, a 1.5 μm band can be mentioned as a particularly suitable wavelength. The wavelength, waveform or the like of the generated optical pulse is not limited to this, but may be arbitrary. The optical amplifier 15 is used to generate the nonlinear optical effect (self-phase modulation effect) in the normal dispersion-decreasing fiber 16. Incidentally, the output from the optical amplifier 15 is a nonlinear pulse. Here, the nonlinear optical pulse indicates an optical pulse having a power necessary to obtain the nonlinear optical effect in the normal dispersion-decreasing fiber 16.

The optical dispersion-decreasing fiber 16 is an optical fiber which has a normal dispersion value and in which the magnitude of the dispersion value is decreased in the longitudinal direction. For example, as the normal dispersion-decreasing fiber 16, one fiber in which the magnitude of the dispersion value is continuously changed can be used. Incidentally, in this embodiment and in general, "that the magnitude of the dispersion value is decreased" means that the absolute value of the dispersion value is decreased, and the normal dispersion fiber as stated above is called the normal dispersion-decreasing fiber. The normal dispersion-decreasing fiber 16 can be realized by, for example, continuously changing the core diameter of a normal optical fiber made of silica glass in the longitudinal direction. Specifically, this can be realized such that for example, in the process of drawing a fiber at the time of manufacture, the speed of drawing is changed to change the core diameter. Besides, as the normal dispersion-decreasing fiber 16, the continuous decrease of the dispersion value of the fiber may be discretely approximated by cascading some kinds of fibers in which the dispersion value is constant or is linearly changed in the longitudinal direction, or the dispersion value is continuously changed.

Here, a function D(z) to express the change of a dispersion value of the normal dispersion-decreasing fiber 16 in the longitudinal direction can be selected to be decreased with a distance (coordinate in the longitudinal direction) z as follows:

$$D(z)=D_0/(1+D_0\Gamma z).$$

Where $\Gamma$ denotes the ratio of decrease of the magnitude of the normal dispersion.

FIG. 5(b) shows an example of the change of the dispersion value of the normal dispersion-decreasing fiber 16. In the figure, a dotted line indicates the fiber 16 in which the dispersion value is continuously changed, and a solid line indicates an example in which approximation is made by cascading three kinds of fibers in which the dispersion values are linearly changed in the longitudinal direction. Incidentally, in this example, although the three kinds of fibers are used, limitation is not made to this, and a suitable number of fibers can be used. Besides, the function D(z) is all normalized by a value at z=0 (for example, about −4 ps/nm/km in the example of the optical fiber shown in FIG. 5(b)), and may be expressed as $D_0=1$ or that the function value at the incident end (z=0) is D(z)=1.

Figure 1:
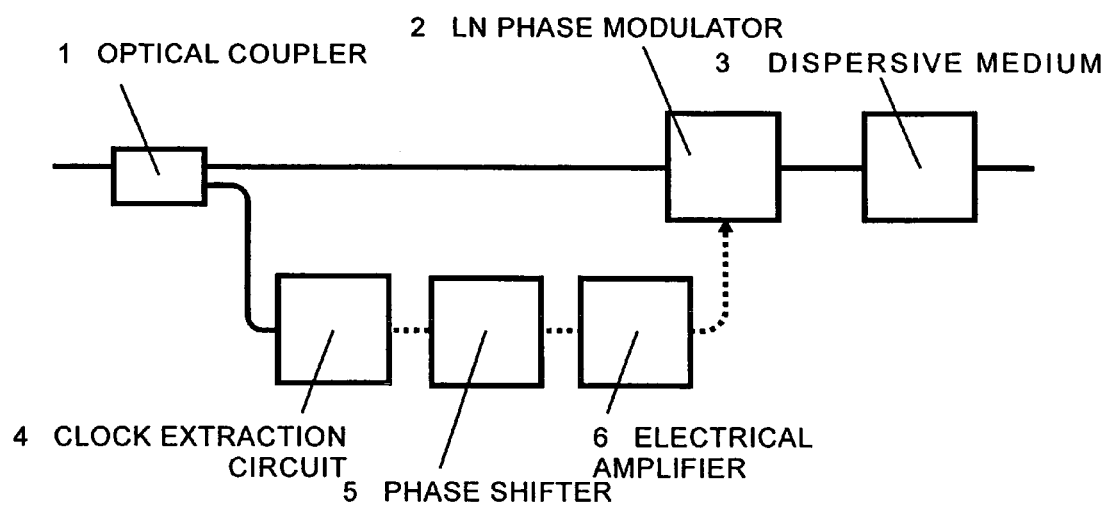
FIG. 1 is a view showing a structure of a conventional optical Fourier transform device.
Figure 2:
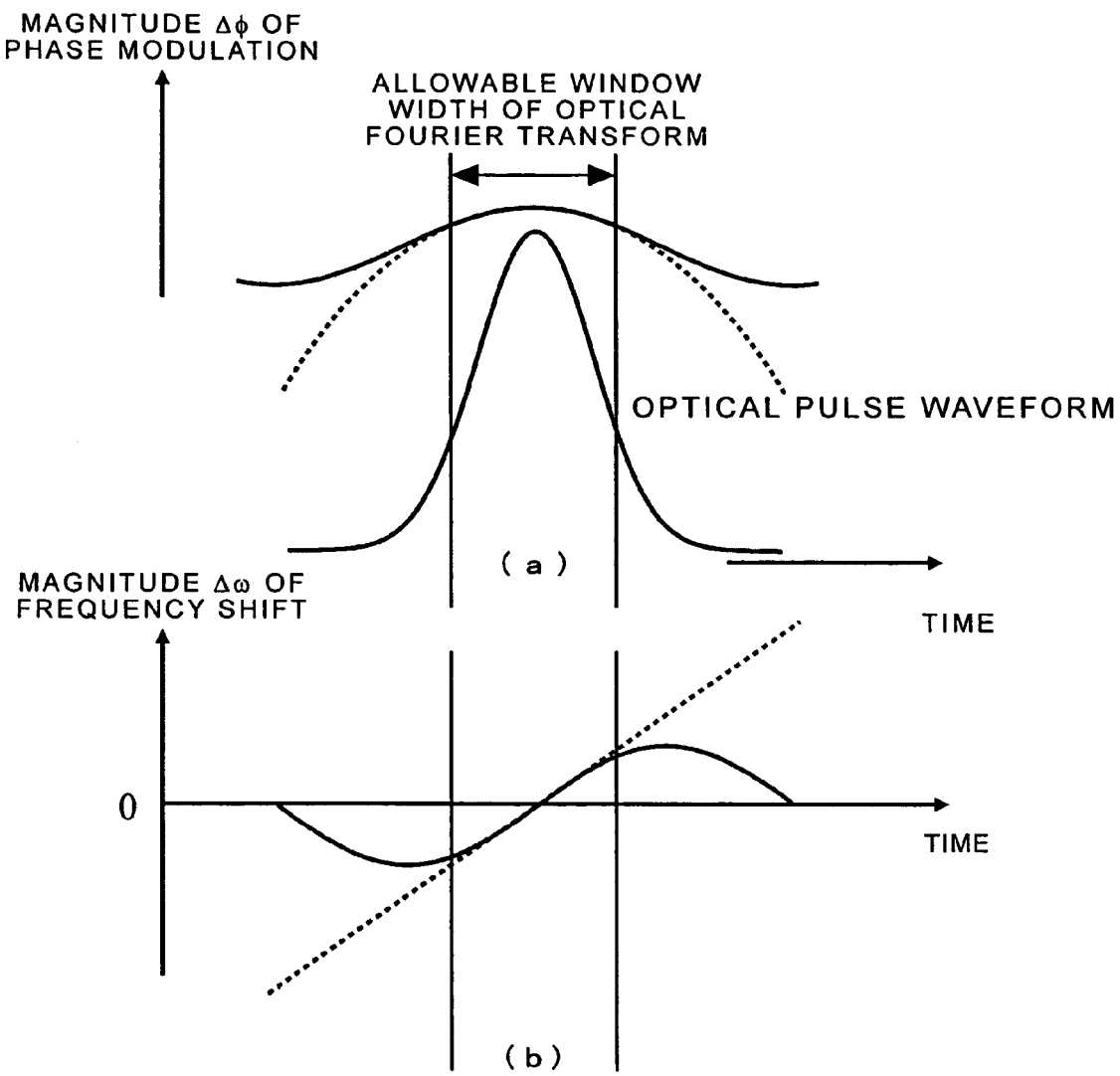
FIG. 2 is a schematic view showing the magnitude of a phase modulation applied to an optical pulse by an LN phase modulator and the magnitude of a frequency shift. Dotted lines indicate an ideal phase modulation characteristic and the magnitude of the frequency shift.
Figure 6:
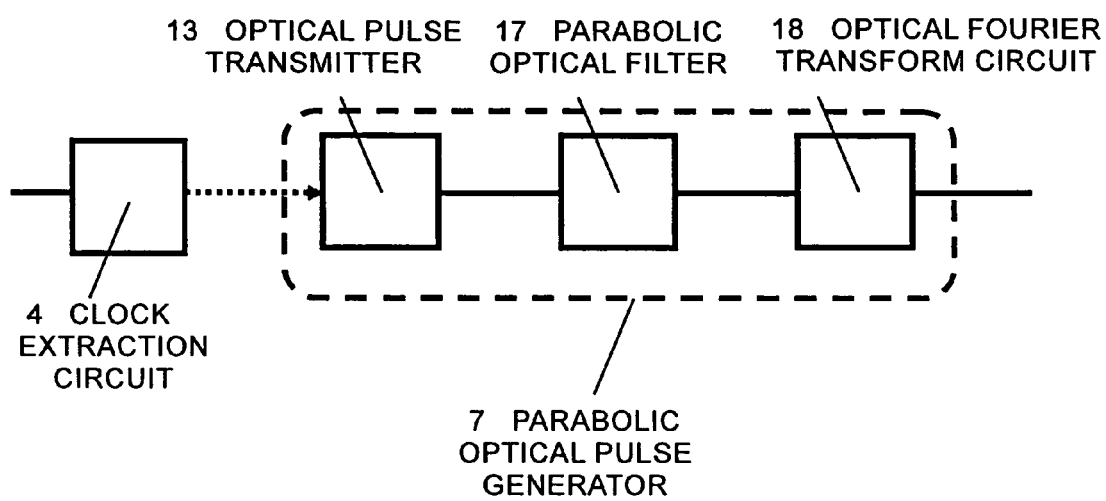
FIG. 6 is a view showing a structure (third mode) of the parabolic optical pulse generator 7 in FIG. 3.

The third mode is a mode in which the spectrum shape of an optical pulse is shaped into a parabola by a parabolic optical filter with an amplitude transmission characteristic expressed by a quadratic function, and the parabolic spectrum shape is converted into the parabolic optical pulse waveform by a conventional optical Fourier transform device (for example, the device shown in FIG. 1). FIG. 6 shows a structure of a parabolic optical pulse generator 7 according to the third mode. The parabolic optical pulse generator 7 of the third mode includes an optical pulse transmitter 13, a parabolic optical filter 17 and an optical Fourier transform circuit 18. An optical pulse emitted from the optical pulse transmitter 13, which is driven by a clock signal similarly to the first mode, is launched to the parabolic optical filter 17, the spectrum shape thereof is shaped into a parabola, and when it is launched to the conventional optical Fourier transform circuit 18, the parabolic optical pulse in which the temporal waveform is parabola is obtained at the output thereof.

Here, in the third mode, the optical Fourier transform circuit 18 similar to a conventional one is used. The characteristic of optical Fourier transform depends on a relation between the time width of a pulse having a parabolic spectrum shape and a characteristic of a phase modulator. Thus, in the phase modulator used in the conventional optical Fourier transform circuit 18, when there is a pulse having passed through the parabolic optical filter 17 in a time range in which the modulation characteristic can be approximated by a quadratic function, the quadratic function type control optical pulse can be obtained at the output.

(Detailed Operation Description)

Next, the operation of the optical Fourier transform device in this embodiment will be described. In FIG. 3, first, a signal optical pulse train is separated into two parts by the optical coupler 1, and one of them is connected to the clock extraction circuit 4 to extract a clock signal of the pulse train.

The signal optical pulse (wavelength $\lambda_s$) having a temporal waveform u(t) and a frequency spectrum U($\omega$) is coupled by the coupler 9 with the parabolic control optical pulse (wavelength $\lambda_c$) emitted from the parabolic optical pulse generator 7, and they are launched to the optical Kerr medium 10. At this time, a suitable time delay is given by the optical delay element 8 so that the center time position of the control optical pulse is matched with the timing of the signal optical pulse. Here, the temporal waveform u(t) of the signal optical pulse and the frequency spectrum U($\omega$) thereof are related by

[Mathematical formula 4]

$$U(\omega) = \int_{-\infty}^{\infty} u(t)\exp(i\omega t)dt \qquad (3)$$

In the optical Kerr medium 10, the instantaneous frequency of the signal light is modulated according to the time change of the control light intensity by the cross phase modulation between the signal light and the control light. Incidentally, it is assumed that the intensity of the signal light is sufficiently small as compared with the control light, and the self phase modulation by the intensity change of the signal light itself can be neglected. By differentiating a phase change $\delta\phi=(2\pi/\lambda)(2n_2 I)l$ due to the cross phase modulation, a change (chirp) $\delta\omega$ of the instantaneous frequency occurring in the signal light in the optical Kerr medium 10 having a length l becomes

[Mathematical formula 5]

$$\delta\omega(t) = -\frac{\partial \delta\phi}{\partial t} = -\frac{4\pi}{\lambda_s}n_2 l\frac{\partial I(t)}{\partial t} \qquad (4)$$

Where I(t) denotes the intensity of the control light per unit area, and $n_2$ denotes a constant called a Kerr coefficient.

The parabolic optical pulse as the control light has the temporal waveform $u_c(t)$ given by a following expression.

[Mathematical formula 6]

$$u_c(t) = \begin{cases} \sqrt{P_0[1-(t/T_0)^2]^{1/2}}, & |t| \le T_0 \\ 0, & |t| > T_0 \end{cases} \qquad (5)$$

Where $T_0$ denotes a time width from the center of the parabolic optical pulse to the edge. For example, $T_0$ denotes the width between the time when the intensity of the parabolic optical pulse becomes zero and the time of the center (peak) of the pulse. Incidentally, the expression (5) is an expression with respect to the amplitude of the pulse, and the power is expressed in the form of the square of time t. Accordingly, the chirp generated in the signal light by the cross phase modulation is given from expressions (4) and (5) by

[Mathematical formula 7]

$$\delta\omega(t) = \begin{cases} \frac{4\pi}{\lambda_s} \frac{n_2}{A_{eff}} l \cdot \frac{2P_0}{T_0^2} t, & |t| \leq T_0 \\ 0, & |t| > T_0 \end{cases} \quad (6)$$

Where $P_0$ denotes the peak power of the control light, $A_{eff}$ denotes the effective cross section, and I(t) is $$I(t)=|u_c(t)|^2/A_{eff}.$$

That is, although the phase modulation characteristic of the optical Kerr medium 10 depends on the waveform of the control light as indicated in expression (4), when the intensity of the control light is parabolic as in this embodiment, the linear chirp $\delta\omega=-Kt$ (that is, the phase modulation $\delta\phi=\exp(iKt^2/2)$) is uniformly applied to the signal light over the time width $2T_0$. Where, from expression (6),

[Mathematical formula 8]

$$K = -\frac{8\pi n_2 P_0 l}{\lambda_s A_{eff} T_0^2} = -\frac{4\gamma P_0 l}{T_0^2} \quad (7)$$

($\gamma$ denotes a nonlinear constant).

Figure 7:
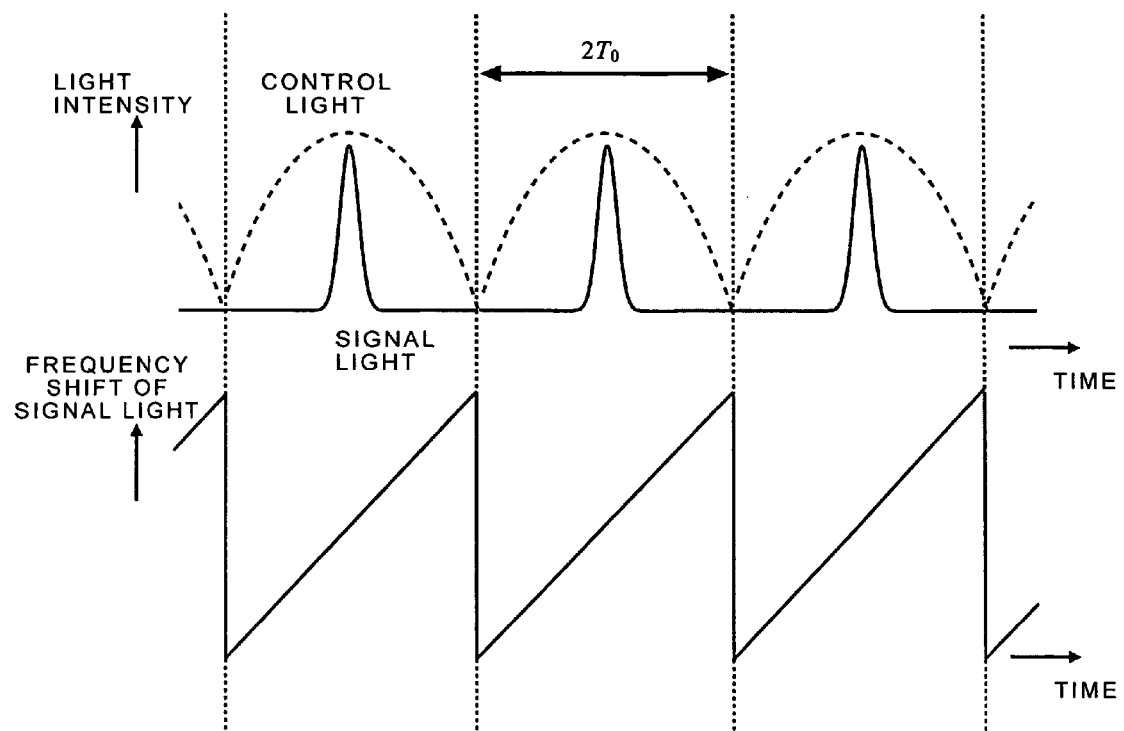
FIG. 7 is a schematic view showing a state in which a linear chirp is applied to signal light by the cross phase modulation between the control light and the signal light.

FIG. 7 schematically shows a state in which a linear chirp is applied to each optical pulse constituting the signal optical pulse train by the cross phase modulation between itself and the parabolic optical pulse train. Here, the base repetition frequency of the signal light and the control optical pulse train is selected to be the inverse of a time width $2T_0$ of the parabolic optical pulse. The upper part of FIG. 7 indicates temporal waveforms of the signal light (solid line) and the control light (dotted line), and the lower part indicates the frequency shift applied to the signal light. As shown in the figure, when the time width from the center of the control light to the edge is made $T_0$, the linear chirp is applied to the signal light over the time width $2T_0$. Incidentally, the magnitude of the chirp rate K can be adjusted by changing the peak power $P_0$ of the control optical pulse, the length l of the optical Kerr medium 10, and the Kerr coefficient (nonlinear refractive index) $n_2$ of the optical Kerr medium 10 (see expression (7)).

Incidentally, in order to generate the cross phase modulation most efficiently, it is desirable that the walk-off caused by a group-velocity mismatch due to a wavelength difference $|\lambda_s-\lambda_c|$ between the signal light and the control light is small (in the above description, it is assumed that the walk-off is zero). Here, the walk-off indicates a group delay occurring between the control light and the signal light by the difference of the group-velocity in the wavelengths of both. For that purpose, for example, the optical Kerr medium 10 having a very small dispersion value is used, or $\lambda_s$ and/or $\lambda_c$ may be set so that $\lambda_s$ and $\lambda_c$ become wavelengths symmetrical to each other with respect to the zero-dispersion wavelength of the optical Kerr medium 10, and the signal light and the control light are subjected to the same time delay in the optical Kerr medium 10. For example, such $\lambda_c$ can be set by the optical pulse transmitter 13 of the parabolic optical pulse generator 7.

The temporal waveform $u_+(t)$ of the signal optical pulse after the linear chirp is applied in the optical Kerr medium 10 is expressed by

[Mathematical formula 9]

$$u_+(t) = u(t)\exp\left(\frac{iKt^2}{2}\right) \quad (8)$$

At this time, different frequencies are assigned to the respective time positions by the frequency shift occurring in the temporal waveform of the signal optical pulse.

After passing through the optical Kerr medium 10, the signal light is separated from the control light by the optical filter 11, and is launched to the dispersive medium 12. The temporal waveform v(t) of the signal optical pulse after passing through the dispersive medium 12 becomes

[Mathematical formula 10]

$$v(t) = \sqrt{\frac{i}{2\pi D}} \int_{-\infty}^{\infty} u_+(t')\exp\left(-\frac{i}{2D}(t-t')^2\right)dt' \quad (9)$$

$$= \sqrt{\frac{i}{2\pi D}} \int_{-\infty}^{\infty} u(t')\exp\left(\frac{iKt'^2}{2}\right)\exp\left(-\frac{i}{2D}(t-t')^2\right)dt'$$

Here, when the dispersion amount of the dispersive medium 12 is selected to D=1/K, expression (9) can be written as

[Mathematical formula 11]

$$v(t) = \sqrt{\frac{i}{2\pi D}} \exp(-iKt^2/2) \int_{-\infty}^{\infty} u(t')\exp(itt'/D)dt' \quad (10)$$

$$= \sqrt{\frac{i}{2\pi D}} \exp(-iKt^2/2)U(t/D)$$

Accordingly, the temporal waveform v(t) of the optical pulse obtained at the output of the dispersive medium 12 is proportional to the spectrum shape $U(\omega)$ (where $\omega=t/D$) of the optical pulse before the optical Fourier transform.

In other words, in the optical Kerr medium 10, the signal light in which the different frequencies are assigned to the respective time positions is given different time delays according to the frequencies by the group-velocity dispersion in the dispersive medium 12. As a result, the respective frequency components of the signal optical pulse are separated from each other in the time domain, and the temporal waveform in proportion to the Fourier transform image $U(\omega)$ of u(t), that is, U(t/D) is obtained by especially selecting the dispersion amount to D=1/K.

(Example of Numerical Calculation)

Next, an example of numerical calculation relating to the optical Fourier transform device of the embodiment will be described. In this numerical calculation, a parabolic pulse obtained by the parabolic optical pulse generator 7 having the structure as shown in FIG. 5 is used as the control light. The energy of the control light is made 20 pJ, the dispersion value in the input of the normal dispersion-decreasing fiber 16 used for the generation of the parabolic optical pulse is made $D_0=-17.5$ ps/nm/km, and the nonlinear coefficient is made $\gamma=3.33$ W$^{-1}$ km$^{-1}$. Besides, the rate of decrease of the dispersion value of the normal dispersion-decreasing fiber 16 is made Γ=0.062 m$^{-1}$. A Gaussian pulse with a pulse width of 1.0 ps is incident on the normal dispersion-decreasing fiber 16.

Figure 8:
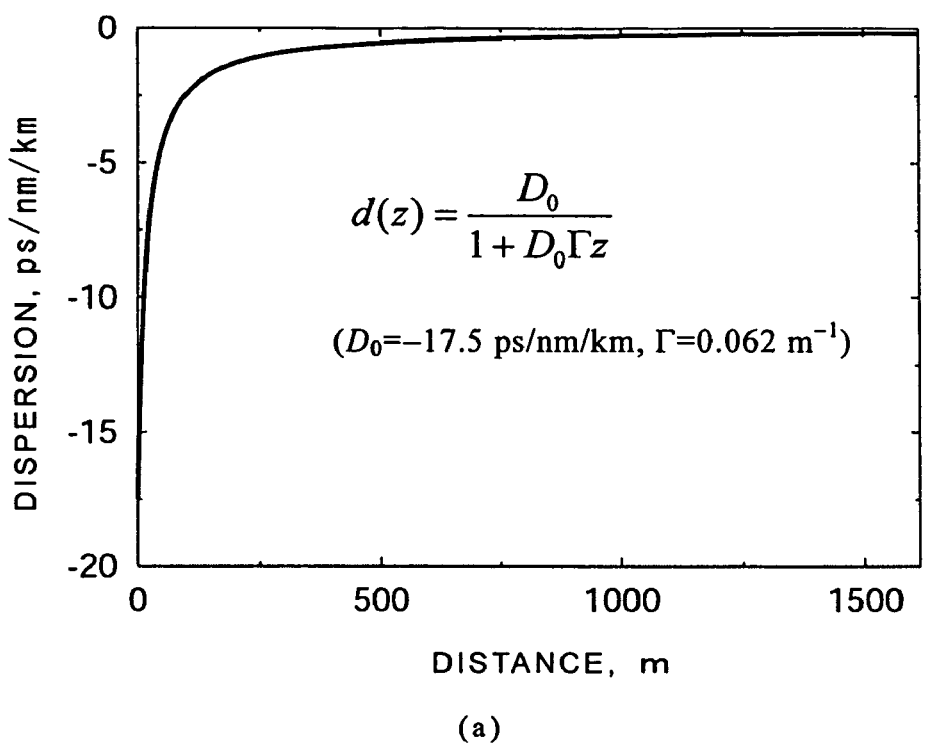
FIG. 8 is a view showing a change (a) of a dispersion value of a normal dispersion-decreasing fiber 16 of FIG. 5 in a longitudinal direction, and a temporal waveform (b) of a control optical pulse obtained at the output of the parabolic optical pulse generator 7 when the normal dispersion-decreasing fiber is used in FIG. 5.
Figure 8:
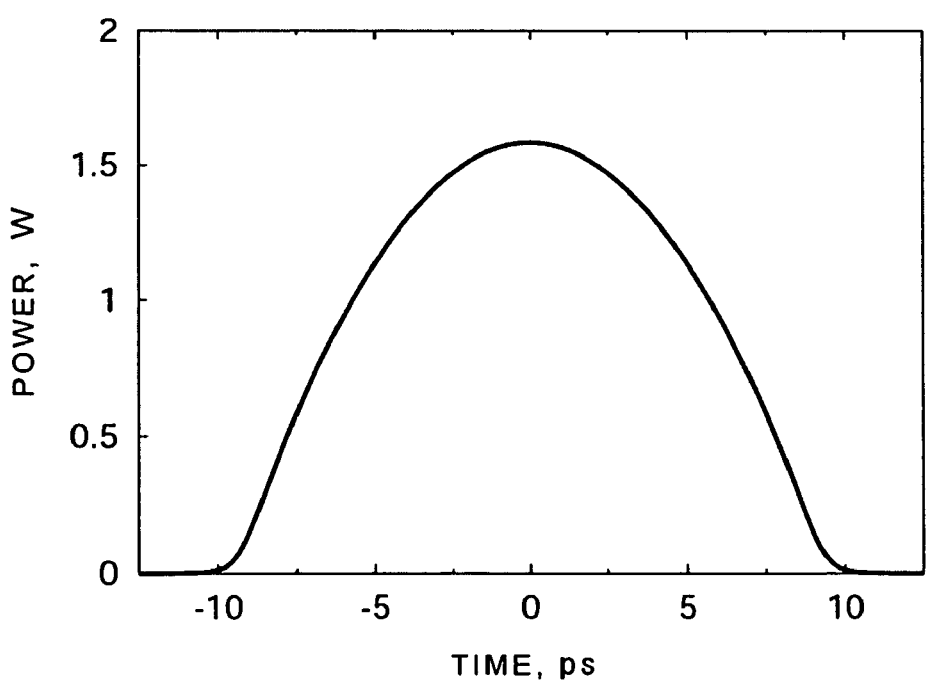

FIG. 8 shows a change (a) of a dispersion value of the normal dispersion-decreasing fiber 16 in the longitudinal direction and a waveform (b) of the control optical pulse at the output. The peak power of the obtained control light is $P_0$=1.58 W, and the time width is $T_0$=12 ps. Incidentally, since the edge portion of the parabolic optical pulse shown in FIG. 8(b) is smoothly decreased, the strength becomes zero at about 12 ps.

Figure 9:
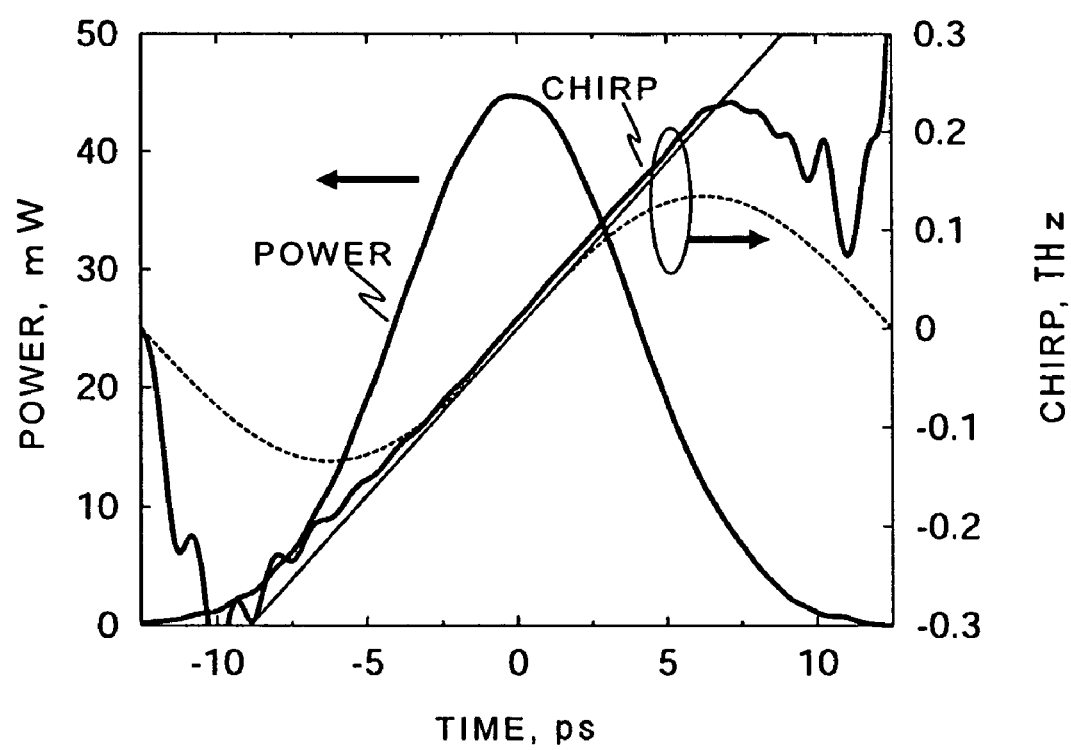
FIG. 9 is a view showing the temporal waveform of signal light which is separated by an optical filter 11 after transmitting through an optical Kerr medium 10 in FIG. 3 and a frequency chirp. In the figure, a thin solid line indicates a theoretical value of the frequency chirp applied to the signal light, and a thin dotted line indicates the frequency chirp applied to the signal light by a conventional LN phase modulator.

Next, FIG. 9 is a view showing the temporal waveform of the signal light separated by the optical filter 11 after being transmitted through the optical Kerr medium 10 and the frequency chirp. In the figure, a thin solid line indicates the theoretical value of the frequency chirp applied to the signal light, and a thin dotted line indicates the frequency chirp applied to the signal light by a conventional LN phase modulator. Besides, thick solid lines indicate the power and chirp in this numerical calculation example. Arrows and an ellipse in the figure indicate a graph in which the left axis represents the power, and the right axis represents the chirp. The waveform and chirp shown in FIG. 9 indicate, in the system having the structure as shown in FIG. 3, the temporal waveform and frequency chirp of the signal light separated from the control light by the optical filter 11 after the signal light with a pulse width of 10 ps and having a Gaussian form and the control light obtained at the output of the normal dispersion-decreasing fiber 16 are coupled by the coupler 9 and are transmitted through the optical Kerr medium 10. Here, the wavelength interval of the signal light and the control light is made 20 nm. Besides, a dispersion-shifted fiber with a dispersion value of −0.2 ps/nm/km, a nonlinear coefficient of 3.33 W$^{-1}$ km$^{-1}$, and a length of 1450 m is used as the optical Kerr medium 10. The theoretical value of the chirp rate obtained by substituting these values for expression (7) is K=−0.212ps$^{-2}$. It turns out that the linear chirp (thin solid line in the figure) obtained from this theoretical value well coincides with the numerical calculation result. Besides, it turns out that as compared with the frequency chirp (thin dotted line in the figure) applied to the signal light by the LN phase modulator used for the conventional optical Fourier transform device, an range in which the chirp is linear is much expanded.

Figure 10:
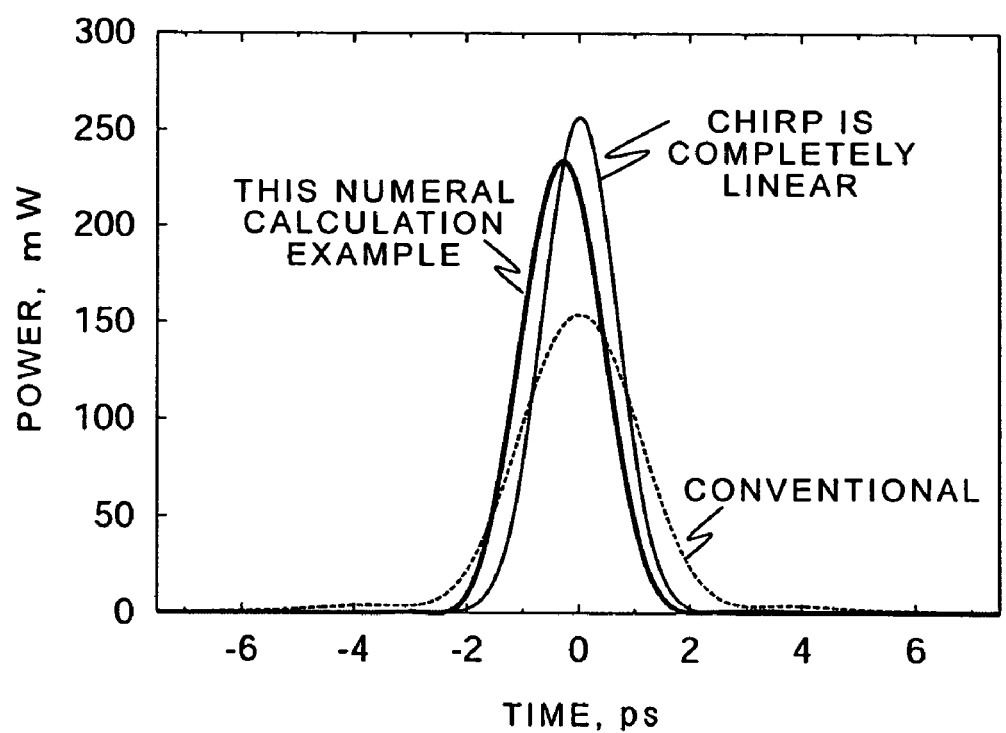
FIG. 10 is a view showing a temporal waveform of signal light at the output of a dispersive medium 12 in FIG. 3. In the figure, a thin solid line indicates the result of optical Fourier transform when an ideal linear chirp is applied to the signal light in the optical Kerr medium 10, and a thin dotted line indicates the result of optical Fourier transform when a chirp is applied to the signal light by using a conventional LN type optical modulator.

FIG. 10 shows the waveform (thick line) of signal light after the chirped signal light is further launched to the dispersive medium 12 and is transmitted. Here, the dispersion amount of the dispersive medium 12 is set to D=1/K=−4.72 ps$^2$. A thin solid line indicates the waveform v(t) of signal light u(t) after optical Fourier transform calculated by using expression (10) on the assumption that the chirp is completely linear (linear chirp is applied to the signal light in the optical Kerr medium 10), and a thin dotted line indicates a result obtained when optical Fourier transform is performed by using the conventional LN phase modulator (when chirp is applied to the signal light by using the LN type optical modulator). When the LN phase modulator is used, a distortion occurs in the Fourier transform image, however, it turns out that by using the optical Fourier transform device of this embodiment, a distortion does not occur in the Fourier transform image, and the pulse width after the transform is equal to the pulse width obtained when the chirp is completely linear.

B. Second Embodiment

Figure 11:
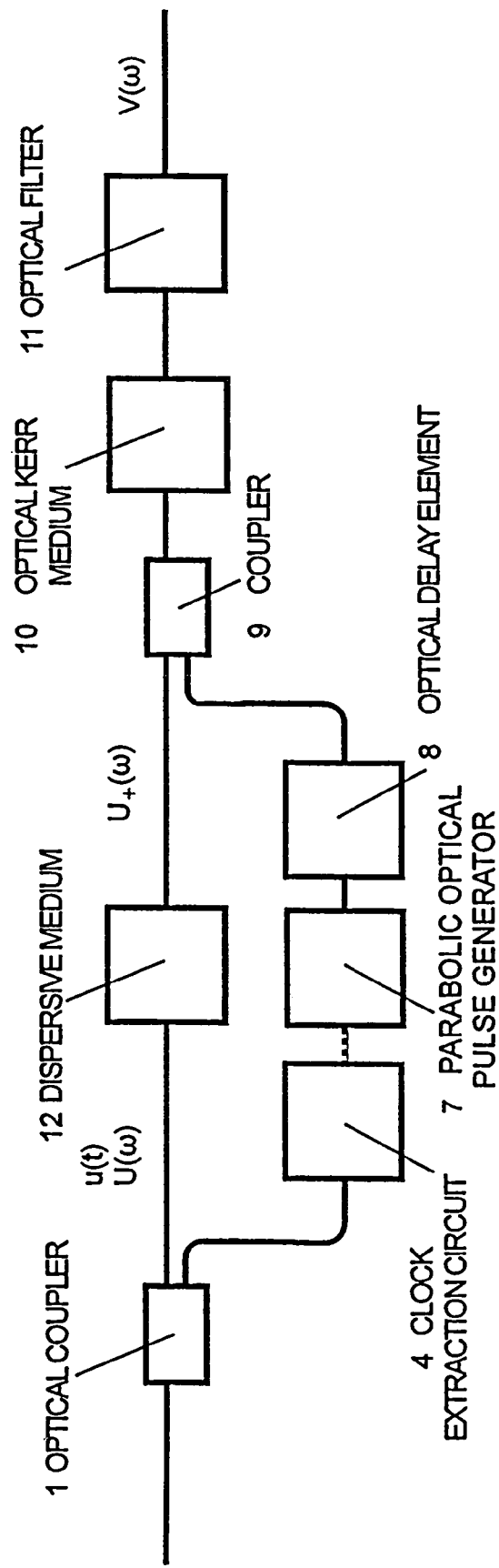
FIG. 11 is a view showing a structure of a second embodiment of an optical Fourier transform device of the invention.

FIG. 11 is a structural view of an optical Fourier transform device of a second embodiment of the invention. A difference from the optical Fourier transform device of the first embodiment is that a dispersive medium 12 is positioned in front of a coupler 9 in this embodiment. Since the other structure is similar to the foregoing, its description will be omitted. Besides, a parabolic optical pulse generator 7 can have one of the structures of FIGS. 4 to 6 similarly to the first embodiment.

Next, the operation of the optical Fourier transform device of this embodiment will be described. In FIG. 11, a signal optical pulse (wavelength $\lambda_s$) having a temporal waveform u(t) and a frequency spectrum U(ω) and separated by an optical coupler 1 is first launched to the dispersive medium 12. A frequency spectrum $U_+(\omega)$ of the signal optical pulse at the output of the dispersive medium 12 is given by

[Mathematical formula 12]

$$U_+(\omega) = U(\omega)\exp\left(\frac{iD\omega^2}{2}\right) \quad (11)$$

Next, the signal optical pulse and a parabolic control optical pulse (wavelength $\lambda_c$) emitted from the parabolic optical pulse generator 7 are coupled by the coupler 9, and are launched to an optical Kerr medium 10. At this time, a suitable time delay is given to the control optical pulse by an optical delay element 8 so that the center time position of the control optical pulse is matched with the timing of the signal optical pulse. In the optical Kerr medium 10, similarly to the first embodiment, a linear chirp δω (expression (6)) is applied to the signal light by the cross phase modulation between itself and the control light. After passing through the optical Kerr medium 10, the signal light and the control light are separated by an optical filter 11. A frequency spectrum V(ω) of the signal light at the output of the optical filter 11 is given by the convolution integral to $U_+(\omega)$, and becomes

[Mathematical formula 13]

$$V(\omega) = \sqrt{\frac{i}{2\pi K}} \int_{-\infty}^{\infty} U_+(\omega')\exp\left(-\frac{i}{2K}(\omega-\omega')^2\right)d\omega' \quad (12)$$

$$= \sqrt{\frac{i}{2\pi K}} \int_{-\infty}^{\infty} U(\omega')\exp\left(\frac{iD\omega'^2}{2}\right)\exp\left(-\frac{i}{2K}(\omega-\omega')^2\right)d\omega'$$

Here, when setting is made so that the chirp rate K of the linear chirp applied by the optical Kerr medium 10 and the dispersion amount D of the dispersive medium 12 satisfy D=1/K, expression (12) is written as

[Mathematical formula 14]

$$V(\omega) = \sqrt{\frac{iD}{2\pi}}\exp(-1D\omega^2/2)\int_{-\infty}^{\infty} U(\omega')\exp(iD\omega\omega')d\omega' \quad (13)$$

$$= \sqrt{2\pi iD}\exp(-iD\omega^2/2)u(-D\omega)$$

Here,

[Mathematical formula 15]

$$u(t) = \frac{1}{2\pi}\int_{-\infty}^{\infty} U(\omega)\exp(-i\omega t)\,d\omega$$

is used. Accordingly, the frequency spectrum $V(\omega)$ of the signal optical pulse separated by the optical filter 11 is in proportion to the temporal waveform $u(t)$ (where $t=-D\omega$) of the optical pulse before the optical Fourier transform.

C. Third Embodiment

Figure 12:
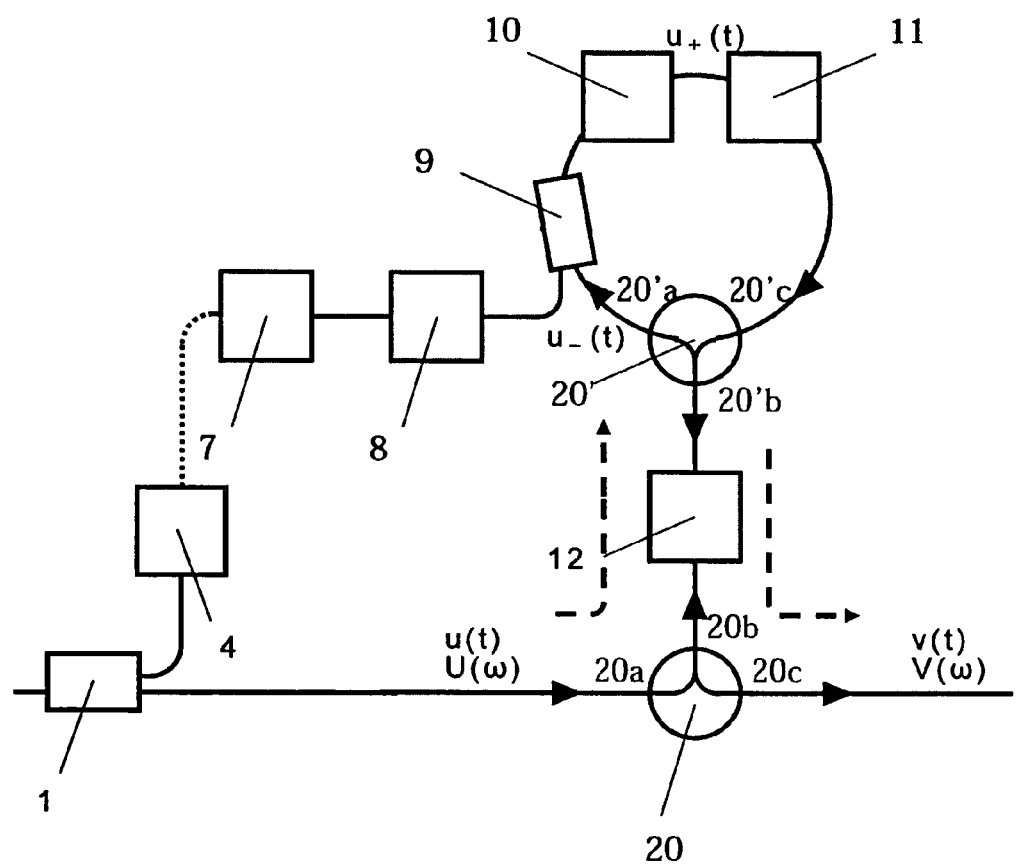
FIG. 12 is a view showing a structure of a third embodiment of an optical Fourier transform device of the invention.

FIG. 12 is a structural view of an optical Fourier transform device of a third embodiment. The optical Fourier transform device of the third embodiment includes an optical coupler 1, a clock extraction circuit 4, a parabolic optical pulse generator 7, an optical delay element 8, a coupler 9, an optical Kerr medium 10, an optical filter 11, a dispersive medium 12, and optical circulators 20 and 20'. Since what are denoted by the same reference numerals as those of the optical Fourier transform device shown in FIG. 3 are similar to the foregoing, their description will be omitted.

In the figure, signal light separated by the optical coupler 1 is first launched to a port 20*a* of the optical circulator 20. The port 20*a* is connected to a port 20'*a* through a port 20*b*, the dispersive medium 12, and a port 20'*b* of the optical circulator 20'. The port 20'*a* and the port 20'*c* of the optical circulator 20' are connected in a loop through the coupler 9, the optical Kerr medium 10 and the optical filter 11. The signal light separated by the optical filter 11 again passes through the dispersive medium 12 through the port 20'*c* and the port 20'*b*, and then is emitted from a port 20*c* through the port 20*b* of the optical circulator 20. The signal light is incident on the one input of the coupler 9 from the port 20'*a* of the optical circulator 20', and the control light generated by the parabolic optical pulse generator 7 and the optical delay element 8 is incident on the other input. The optical delay element 8 is used to give a suitable time delay to the control light so that the center time position of the control optical pulse is matched with the timing of the signal optical pulse in the optical Kerr medium 10.

Next, the operation of the optical Fourier transform device in this embodiment will be described. In FIG. 12, a temporal waveform $u_-(t)$ of the signal optical pulse at the output of the dispersive medium 12 is expressed by the convolution integral while using the temporal waveform $u(t)$ of the input signal optical pulse and by a following expression.

[Mathematical formula 16]

$$u_-(t) = \sqrt{\frac{i}{2\pi D}}\int_{-\infty}^{\infty} u(t')\exp\!\left(-\frac{i}{2D}(t-t')^2\right)dt' \tag{14}$$

Next, the signal light is coupled with the control light, and then is launched to the optical Kerr medium 10, and the linear chirp $\delta\omega$ (expression (6)) is applied to the signal light by the cross phase modulation between itself and the control light. As a result, the temporal waveform $u_+(t)$ of the signal optical pulse at the output of the optical Kerr medium 10 is expressed by using $u_-(t)$ as follows:

[Mathematical Formula 17]

$$u_+(t) = u_-(t)\exp(iKt^2/2) \tag{15}$$

Further, the signal light is separated from the control light by the optical filter 11, and is again launched to the dispersive medium 12. As a result, the temporal waveform $v(t)$ of the signal optical pulse is written by using $u_+(t)$ as follows:

[Mathematical formula 18]

$$v(t) = \sqrt{\frac{i}{2\pi D}}\int_{-\infty}^{\infty} u_+(t')\exp\!\left(-\frac{i}{2D}(t-t')^2\right)dt' \tag{16}$$

When the dispersion amount of the dispersive medium 12 is set to $D=1/K$, from expressions (14) to (16), the signal optical pulse waveform finally emitted becomes

[Mathematical formula 19]

$$\begin{aligned}v(t) &= \frac{i}{2\pi D}\int_{-\infty}^{\infty}\!\left[\int_{-\infty}^{\infty} u(t'')\exp\!\left(-\frac{i}{2D}(t'-t'')^2\right)dt''\right]\\ &\qquad \exp\!\left(\frac{iKt'^2}{2}\right)\exp\!\left(-\frac{i}{2D}(t-t')^2\right)dt'\\ &= \frac{i}{2\pi D}\int_{-\infty}^{\infty} u(t'')\exp\!\left(-\frac{i}{2D}(t''^2+t^2)\right)\\ &\qquad \int_{-\infty}^{\infty}\exp\!\left(-\frac{i}{2D}[t'^2-2(t''+t)t']\right)dt'\,dt''\\ &= \sqrt{\frac{i}{2\pi D}}\int_{-\infty}^{\infty} u(t'')\exp\!\left(\frac{it}{D}t''\right)dt''\\ &= \sqrt{\frac{i}{2\pi D}}\,U(t/D)\end{aligned} \tag{17}$$

Where $U(\omega)$ ($\omega=t/D$) is Fourier transform (expression (1)) of $u(t)$. That is, the output temporal waveform $v(t)$ of the optical Fourier transform device is proportional to the spectrum shape $U(\omega)$ of the input waveform to the optical Fourier transform device. In this embodiment, the signal light passes through the dispersive medium 12 twice so that the chirp is completely compensated, and it is noted that differently from the first embodiment, the transform-limited waveform without chirp is obtained at the output.

Incidentally, the frequency spectrum of the emitted signal optical pulse becomes

[Mathematical formula 20]

$$\begin{aligned}V(\omega) &= \int_{-\infty}^{\infty} v(t)\exp(i\omega t)\,dt\\ &= \sqrt{\frac{i}{2\pi D}}\int_{-\infty}^{\infty} U(t/D)\exp(i\omega t)\,dt\\ &= \sqrt{2\pi iD}\,u(-D\omega)\end{aligned} \tag{18}$$

and the spectrum shape $V(\omega)$ of the output waveform of the optical Fourier transform device is proportional to the temporal waveform $u(t)$ of the input to the optical Fourier transform device.

D. Fourth Embodiment

Figure 13:
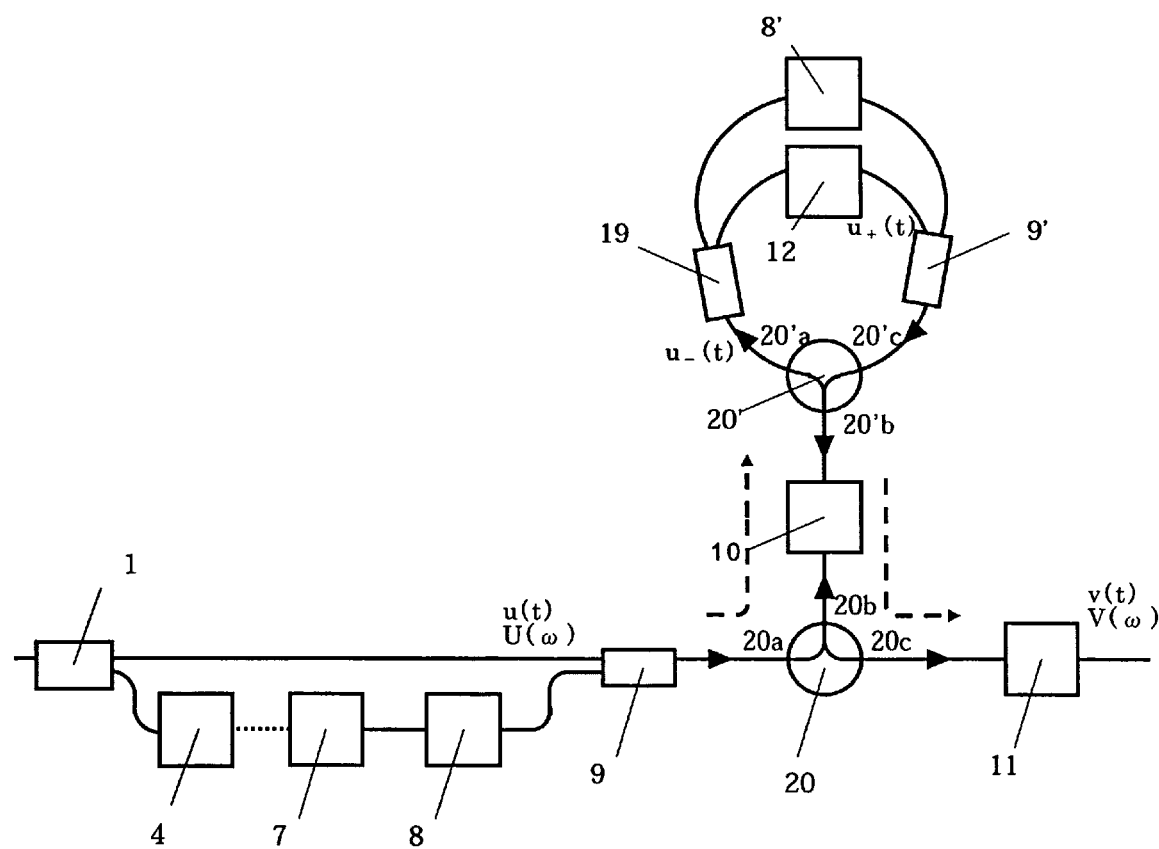
FIG. 13 is a view showing a structure of a fourth embodiment of an optical Fourier transform device of the invention.

FIG. 13 shows a structure of an optical Fourier transform device of a fourth embodiment. The optical Fourier transform device of the fourth embodiment includes an optical coupler 1, a clock extraction circuit 4, a parabolic optical pulse generator 7, optical delay element 8 and 8', couplers 9 and 9', an optical Kerr medium 10, an optical filter 11, a dispersive medium 12, an optical filter (a branching filter) 19, and optical circulators 20 and 20'. Since what are denoted by the same reference numerals as those of the optical Fourier transform device shown in FIG. 3 are similar to the foregoing, their description will be omitted.

In the figure, the signal light is first coupled by the coupler 9 with the control light generated by the parabolic optical pulse generator 7 and the optical delay element 8. The output of the coupler 9 is connected to the optical filter 19 to separate the control light from the signal light through a port 20a and a port 20b of the optical circulator 20, the optical Kerr medium 10, a port 20'b and a port 20'a of the optical circulator 20'. The optical filter 19 separates the control light from the signal light. The one output (signal light) of the optical filter 19 and the other output (control light) thereof are connected to the respective inputs of the coupler 9' through the dispersive medium 12 and the optical delay element 8', respectively. The control light and the signal light are again coupled in the coupler 9'. The output of the coupler 9' is connected to the optical filter 11 through a port 20'c and the port 20'b of the optical circulator 20', the optical Kerr medium 10, the port 20b and a port 20c of the optical circulator 20. The signal light is separated from the control light by the optical filter 11. The optical delay elements 8 and 8' are used to give a suitable time delay to the control light so that the center time position of the control optical pulse is matched with the timing of the signal optical pulse in the optical Kerr medium 10.

Next, the operation of the optical Fourier transform device in this embodiment will be described. In FIG. 13, a temporal waveform $u_-(t)$ of the signal light, which has been coupled with the control light, has been launched to the optical Kerr medium 10 and has been linearly chirped in the optical Kerr medium 10, is expressed by using the temporal waveform u(t) of the original signal optical pulse and by a following expression.

[Mathematical Formula 21]

$$u_-(t)=u(t)\exp(iKt^2/2) \quad (19)$$

Next, a temporal waveform $u_+(t)$ of the signal light, which has been once separated from the control light by the optical filter 19 and has passed through the dispersive medium 12, is expressed by the convolution integral while using $u_-(t)$ and by a following expression.

[Mathematical formula 22]

$$u_+(t) = \sqrt{\frac{i}{2\pi D}} \int_{-\infty}^{\infty} u_-(t')\exp\left(-\frac{i}{2D}(t-t')^2\right)dt' \quad (20)$$

The waveform v(t) of the signal light, which has been again coupled with the control light, has passed through the optical Kerr medium 10, and has been again given a linear chirp, is written by using $u_+(t)$ as follows:

[Mathematical Formula 23]

$$v(t)=u_+(t)\exp(iKt^2/2) \quad (21)$$

When the dispersion amount of the dispersive medium 12 is set to D=1/K, by expressions (19) to (21), the waveform of the signal optical pulse finally separated by the optical filter 11 and emitted becomes

[Mathematical formula 24]

$$v(t) = \sqrt{\frac{i}{2\pi D}}\, U(t/D) \quad (22)$$

Where U(ω) [ω=t/D] indicates the Fourier transform (expression (1)) of the input temporal waveform u(t) to the optical Fourier transform device. In this embodiment, the signal light passes through the optical Kerr medium 10 twice so that the chirp is completely compensated, and as a result, it is noted that differently from the first embodiment, the transform-limited waveform without chirp is obtained at the output.

Incidentally, similarly to the foregoing expression (18), the frequency spectrum of the signal optical pulse emitted becomes

[Mathematical Formula 25]

$$V(\omega)=\sqrt{2\pi i D}u(-D\omega) \quad (23)$$

and the spectrum shape V(ω) of the output waveform of the optical Fourier transform device is proportional to the temporal waveform u(t) of the input to the optical Fourier transform device.

INDUSTRIAL APPLICABILITY

Various applications using the optical Fourier transform technique are proposed in the fields of ultrahigh-speed optical communication, ultra-short pulse mode-locked laser, optical signal processing and the like, and use can be made in the industry relating to these.

The invention claimed is:

1. An optical Fourier transform device comprising:
   a parabolic optical pulse generator to generate a control optical pulse of a shape expressed by a quadratic function or a parabola;
   a coupler to couple a signal optical pulse with the control optical pulse;
   an optical Kerr medium to linearly chirp the signal optical pulse over an entire pulse, or a wide time range by cross phase modulation between the signal optical pulse and the control optical pulse; and
   a dispersive medium having a group-velocity dispersion, wherein the launched signal optical pulse and the control optical pulse are coupled by the coupler and are introduced into the optical Kerr medium, the launched signal optical pulse is linearly chirped at a chirp rate K by the optical Kerr medium by the cross phase modulation between the signal optical pulse and the control optical pulse, the signal optical pulse emitted from the optical Kerr medium is made to pass through the dispersive medium whose dispersion amount D is D=1/K, to convert a temporal waveform of the launched signal optical pulse into a shape of a frequency spectrum thereof.

2. The optical Fourier transform device according to claim 1, wherein the signal optical pulse having passed through the dispersive medium and the control optical pulse are again coupled and are introduced into the optical Kerr medium, the signal optical pulse having passed through the dispersive medium is again linearly chirped by the optical Kerr medium by the cross phase modulation between the signal optical pulse and the control optical pulse, to convert the temporal waveform of the launched signal optical pulse into the shape of the frequency spectrum thereof, and the shape of the frequency spectrum of the launched signal optical pulse into the temporal waveform thereof.

3. The optical Fourier transform device according to claim 2, comprising:
   an optical filter that separates the signal optical pulse having passed through the optical Kerr medium from the control optical pulse and introduces the separated signal optical pulse into the dispersive medium; and
   a coupler that again couples the signal optical pulse having passed through the dispersive medium and the separated control optical pulse and introduces them into the optical Kerr medium.

4. The optical Fourier transform device according to claim 2, wherein the signal optical pulse is made to pass through the optical Kerr medium twice so that chirp is completely compensated, and a transform-limited waveform without chirp is obtained at output.

5. The optical Fourier transform device according to claim 1, wherein the signal optical pulse is made to pass through the optical Kerr medium twice so that chirp is completely compensated, and a transform-limited waveform without chirp is obtained at output.

6. The optical Fourier transform device according to claim 1, wherein a chirp rate K of a frequency chirp applied to the signal optical pulse by the cross phase modulation between the signal optical pulse and the control optical pulse by the optical Kerr medium and a dispersion amount D of the dispersive medium satisfy a relation of D=1/K, and the chirp rate K can be adjusted by one of or plurality of a peak power of the control optical pulse, wherein a length of the optical Kerr medium, and a nonlinear refractive index of the optical Kerr medium.

7. The optical Fourier transform device according to claim 1, wherein the parabolic optical pulse generator comprises:
   an optical pulse transmitter to generate an optical pulse; and
   an optical fiber amplifier which has a normal dispersion, and through which the optical pulse from the optical pulse transmitter is transmitted.

8. The optical Fourier transform device according to claim 1, wherein the parabolic optical pulse generator comprises:
   an optical pulse transmitter to generate an optical pulse;
   an optical filter whose amplitude transmission characteristic is expressed by a quadratic function or a parabola, which changes a frequency spectrum of the optical pulse from the optical pulse transmitter into a quadratic function type or a parabola; and
   an optical Fourier transform circuit to convert a temporal waveform of the optical pulse into a shape of a frequency spectrum waveform of the optical pulse having passed through the optical filter.

9. The optical Fourier transform device according to claim 1, wherein in order to efficiently generate the high-speed cross phase modulation between the control light and the signal light, a low dispersion optical Kerr medium having a small dispersion value is used as the optical Kerr medium, or a wavelength of the signal light and/or the control light is set so that wavelengths of the signal light, and the control light become wavelengths symmetrical to each other with respect to a zero-dispersion wavelength of the optical Kerr medium.

10. The optical Fourier transform device according to claim 1, comprising:
   a clock extraction circuit to extract a clock signal based on the signal optical pulse, and
   an optical delay element to give an optical delay to the control optical pulse, wherein the parabolic optical pulse generator generates the control optical pulse in accordance with the clock signal from the clock extraction circuit, and/or the optical delay element gives the optical delay to the control optical pulse so that timing is matched with the signal optical pulse.

11. An optical Fourier transform device comprising:
   a parabolic optical pulse generator to generate a control optical pulse of a shape expressed by a quadratic function or a parabola;
   a coupler to couple a signal optical pulse with the control optical pulse;
   an optical Kerr medium to linearly chirp the signal optical pulse over an entire pulse or a wide time range by cross phase modulation between the signal optical pulse and the control optical pulse; and
   a dispersive medium having a group-velocity dispersion, wherein the parabolic optical pulse generator comprises:
   a optical pulse transmitter to generate a optical pulse; and
   a dispersion-decreasing fiber in which an absolute value of a normal dispersion is decreased in a longitudinal direction, wherein
   the launched signal optical pulse is made to passes through the dispersive medium, the signal optical pulse emitted from the dispersive medium and the control optical pulse are coupled by the coupler and are introduced into the optical Kerr medium, the signal optical pulse emitted from the dispersive medium is linearly chirped by the optical Kerr medium by the cross phase modulation between the signal optical pulse and the control optical pulse, to convert a shape of a frequency spectrum of the launched signal optical pulse into a temporal waveform.

12. The optical Fourier transform device according to claim 11, wherein the signal optical pulse linearly chirped by the optical Kerr medium is again made to pass through the dispersive medium, to convert the temporal waveform of the launched signal optical pulse into the shape of the frequency spectrum thereof, and the shape of the frequency spectrum of the launched signal optical pulse into the temporal waveform thereof.

13. The optical Fourier transform device according to claim 12, wherein the signal optical pulse is made to pass through the dispersive medium twice so that chirp is completely compensated, and a transform-limited waveform without chirp is obtained at output.

14. The optical Fourier transform device according to claim 11, wherein the signal optical pulse is made to pass through the dispersive medium twice so that chirp is completely compensated, and a transform-limited waveform without chirp is obtained at output.

15. An optical Fourier transform device comprising:
   a parabolic optical pulse generator to generate a control optical pulse of a shape expressed by a quadratic function or a parabola;
   a coupler to couple a signal optical pulse with the control optical pulse;

an optical Kerr medium to linearly chirp the signal optical pulse over an entire pulse or a wide time range by cross phase modulation between the signal optical pulse and the control optical pulse; and a dispersive medium having a group-velocity dispersion, wherein the parabolic optical pulse generator comprises:

an optical pulse transmitter to generate a optical pulse; and a dispersion-decreasing fiber in which an absolute value of a normal dispersion is decreased in a longitudinal direction, wherein the launched signal optical pulse and the control optical pulse are coupled by the coupler and are introduced into the optical Kerr medium, the launched signal optical pulse is linearly chirped by the optical Kerr medium by the cross phase modulation between the signal optical pulse and the control optical pulse, the signal optical pulse emitted from the optical Kerr medium is made to pass through the dispersive medium, to convert a temporal waveform of the launched signal optical pulse into a shape of a frequency spectrum thereof.

16. The optical Fourier transform device according to claim 15, wherein the dispersion-decreasing fiber includes fibers in which a change in a dispersion value is discretely approximated in each section by cascading plural kinds of optical fibers in which a dispersion value is continuously changed, or a dispersion value is constant or is linearly changed in a longitudinal direction, or one fiber in which a dispersion value is continuously changed, and the change in the dispersion value is expressed by a following expression or is approximated by the following expression $D(z)=D_0/(1+D_0\Gamma z)$ (where $D(z)$: a function to express the change in the dispersion value, z: a coordinate of the fiber in the longitudinal direction, $D_0$: a function value at an incident end (z=0), and $\Gamma$: a rate of decrease of magnitude of the normal dispersion).

17. An optical Fourier transform method wherein a launched signal optical pulse and a control optical pulse of a shape expressed by a quadratic function or a parabola are coupled and are introduced into an optical Kerr medium, the launched signal optical pulse is linearly chirped at a chirp rate K over an entire pulse or a wide time range by the optical Kerr medium by the cross phase modulation between the signal optical pulse and the control optical pulse, the signal optical pulse emitted from the optical Kerr medium is made to pass through the dispersive medium having a group-velocity dispersion whose dispersion amount D is $D=1/K$, to convert a temporal waveform of the launched signal optical pulse into a shape of a frequency spectrum thereof.

18. The optical Fourier transform method according to claim 17, wherein the signal optical pulse having passed through the dispersive medium and the control optical pulse are again coupled and are introduced into the optical Kerr medium, the signal optical pulse having passed through the dispersive medium is again linearly chirped by the optical Kerr medium by the cross phase modulation between the signal optical pulse and the control optical pulse, to convert the temporal waveform of the launched signal optical pulse into the shape of the frequency spectrum thereof, and the shape of the frequency spectrum of the launched signal optical pulse into the temporal waveform thereof.

* * * * *